United States Patent
Korinek et al.

(10) Patent No.: US 10,259,616 B2
(45) Date of Patent: Apr. 16, 2019

(54) WHITE PAPER BAG FORMED OF POST-CONSUMER CONTENT WITH CIRCULAR-KNIT PAPER FIBER YARN HANDLE

(71) Applicant: Apple Inc., Cupertino, CA (US)

(72) Inventors: Michael Korinek, San Francisco, CA (US); Eugene Antony Whang, San Francisco, CA (US); Benjamin Andrew Shaffer, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/062,993

(22) Filed: Mar. 7, 2016

(65) Prior Publication Data
US 2016/0264304 A1    Sep. 15, 2016

Related U.S. Application Data

(60) Provisional application No. 62/130,054, filed on Mar. 9, 2015.

(51) Int. Cl.
*B65D 33/12* (2006.01)
*B65D 33/02* (2006.01)
*B65D 30/20* (2006.01)

(52) U.S. Cl.
CPC ............. *B65D 33/12* (2013.01); *B65D 31/10* (2013.01); *B65D 33/02* (2013.01)

(58) Field of Classification Search
CPC ......... B65D 33/12; B65D 31/10; B65D 33/02
USPC ..... 383/14, 17, 20, 25, 26, 27, 33, 34, 34.1, 383/35, 104, 119, 120, 121
See application file for complete search history.

(56) References Cited

U.S. PATENT DOCUMENTS

| | | | | |
|---|---|---|---|---|
| 1,305,199 A | * | 5/1919 | Deubener | B65D 33/12 383/20 |
| 1,418,705 A | * | 6/1922 | Groh | B65D 33/12 383/20 |
| 1,432,150 A | * | 10/1922 | Bertin | B65D 33/12 383/20 |
| 1,520,071 A | * | 12/1924 | Nestor | B65D 33/12 383/20 |
| 1,586,356 A | * | 5/1926 | Du Bois | B65D 33/12 383/18 |
| 1,671,050 A | * | 5/1928 | Snyder | B65D 33/02 383/10 |
| 1,751,473 A | * | 3/1930 | Deubener | B65D 33/10 383/17 |

(Continued)

FOREIGN PATENT DOCUMENTS

| | | | | |
|---|---|---|---|---|
| FR | 2432060 A | * | 3/1980 | |
| JP | 2001271253 A | * | 10/2001 | |
| JP | 2005023445 A | * | 1/2005 | |

OTHER PUBLICATIONS

Howell, Vickie, "How to Make Yarn out of Newspaper (knitting and crochet)," YouTube.com, accessed Jul. 24, 2017 <https://www.youtube.com/watch?v=jKAnClcW6zA.

(Continued)

*Primary Examiner* — Jes F Pascua
(74) *Attorney, Agent, or Firm* — Sterne, Kessler, Goldstein & Fox P.L.L.C.

(57) ABSTRACT

A paper bag is disclosed. The paper bag may include a bag container formed of white solid bleached sulfate paper with at least 60% post-consumer content.

16 Claims, 11 Drawing Sheets

(56) References Cited

U.S. PATENT DOCUMENTS

| | | | | | |
|---|---|---|---|---|---|
| 2,075,672 | A | * | 3/1937 | Stark | B31D 1/06 |
| | | | | | 156/176 |
| 2,448,344 | A | * | 8/1948 | Adams | D04B 9/44 |
| | | | | | 66/16 |
| 2,493,085 | A | * | 1/1950 | Pincus | A45C 3/045 |
| | | | | | 383/127 |
| 2,656,690 | A | * | 10/1953 | Buxbaum | D04B 9/44 |
| | | | | | 66/149 R |
| 2,721,462 | A | * | 10/1955 | Marks | D04B 1/14 |
| | | | | | 383/117 |
| 2,819,467 | A | * | 1/1958 | Marks | B29C 66/3432 |
| | | | | | 226/92 |
| 2,980,312 | A | * | 4/1961 | Gould | A45C 3/04 |
| | | | | | 229/117.09 |
| 3,156,166 | A | * | 11/1964 | Johns | B65D 33/12 |
| | | | | | 29/458 |
| 3,282,038 | A | * | 11/1966 | Howell | D02G 3/06 |
| | | | | | 162/146 |
| 3,339,822 | A | * | 9/1967 | Charles Pearl Curt | |
| | | | | | B65D 33/105 |
| | | | | | 383/20 |
| 4,691,369 | A | * | 9/1987 | Costa | B65D 33/12 |
| | | | | | 383/17 |
| 5,066,363 | A | * | 11/1991 | Lee | B65D 65/46 |
| | | | | | 100/1 |
| 8,256,063 | B2 | * | 9/2012 | Bowman | A45C 13/26 |
| | | | | | 16/114.1 |
| 2006/0185993 | A1 | * | 8/2006 | Wilskey | B65D 33/105 |
| | | | | | 206/278 |
| 2009/0047499 | A1 | * | 2/2009 | Tilton | B32B 27/20 |
| | | | | | 428/323 |
| 2012/0020587 | A1 | * | 1/2012 | Giro Amigo | B65D 29/04 |
| | | | | | 383/8 |
| 2017/0022640 | A1 | * | 1/2017 | Schenk | A45F 3/04 |

OTHER PUBLICATIONS

"Paper yarn," SWICOFIL.com, accessed Jul. 24, 2017, <http://www.swicofil.com/products/060paperyarn.html>.

* cited by examiner

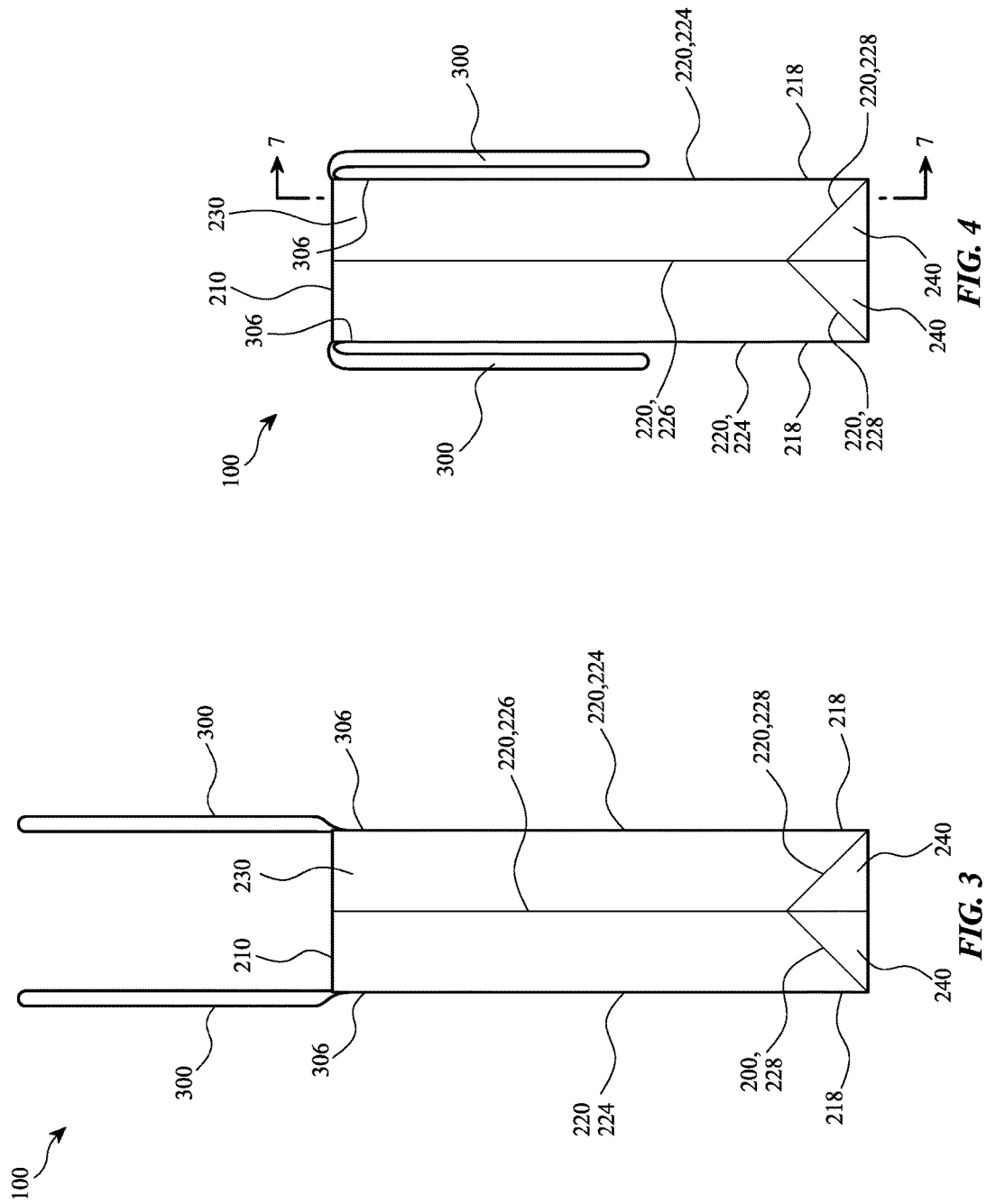

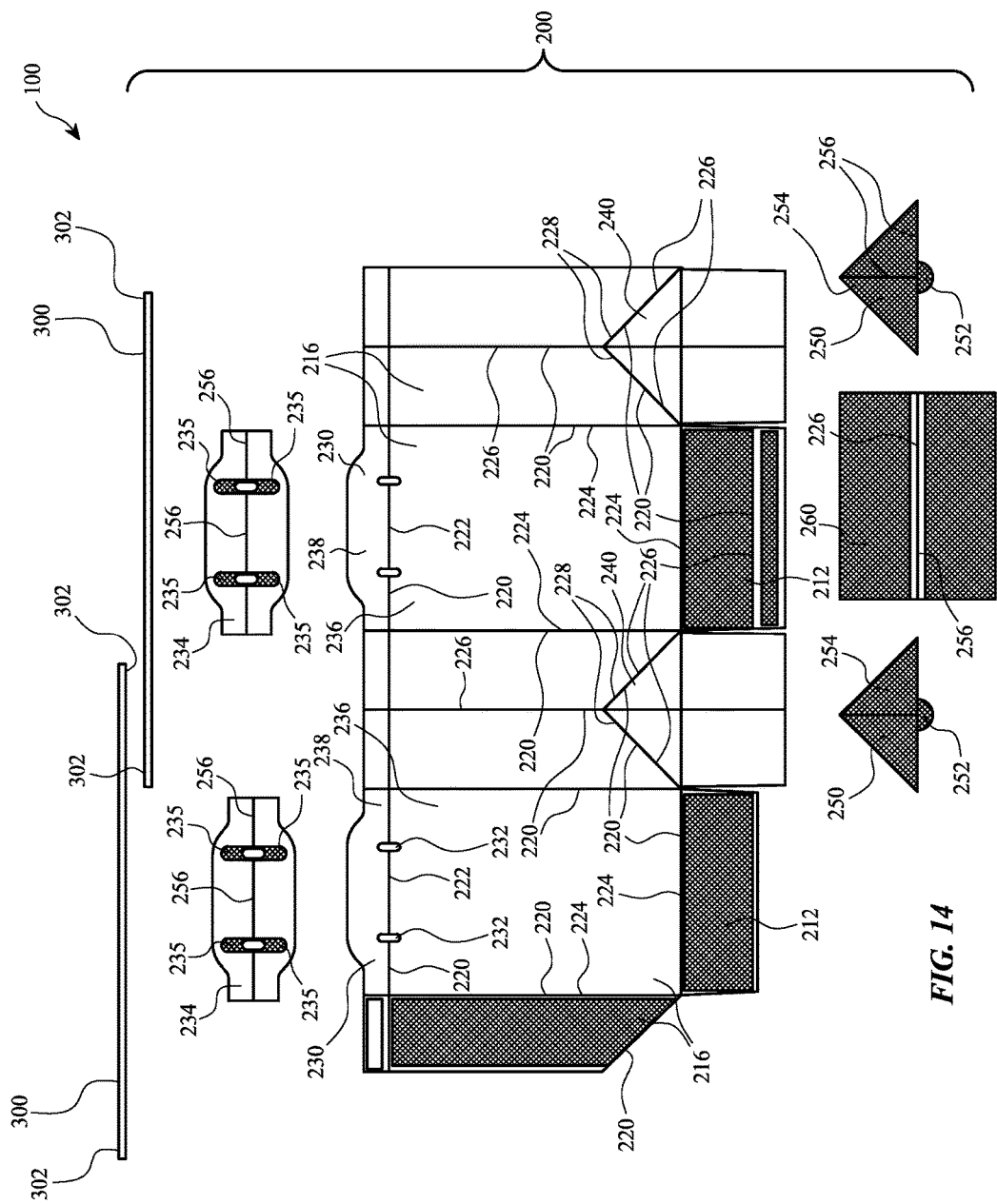

WHITE PAPER BAG FORMED OF POST-CONSUMER CONTENT WITH CIRCULAR-KNIT PAPER FIBER YARN HANDLE

RELATED APPLICATIONS

This application claims priority to U.S. Provisional Patent Application No. 62/130,054 filed Mar. 9, 2015, titled "Bag," which is incorporated herein in its entirety by reference thereto.

FIELD

The described embodiments relate generally to a bag. More particularly, the present embodiments relate to a retail shopping bag made substantially of post-consumer content.

BACKGROUND

Bags are often used for containing items. For example, retail bags may be used to contain items purchased at a retail store.

SUMMARY

Embodiments of the present invention include a paper bag that includes a bag container formed of white paper with at least 60% post-consumer content. The white paper may be formed of solid bleached sulfate. The bag may have a reinforcement insert adhered to its interior, which may extend across and strengthen a fold of the bag container.

Embodiments of the present invention include a paper bag that includes a bag container formed of paper with a top edge including a notch, and a bag handle formed of paper. Ends of the bag handle may extend through the notch and may be fixed to the bag container. In the absence of an applied force on the bag handle, when the bag is in an upright orientation the bag handle may droop below the top edge of the bag container so that at least 90% of the bag handle is below the top edge of the bag container. The bag handle may be formed of paper fibers knitted in an 8-stitch circular-knit pattern, and may have a diameter of at least 6.5 millimeters.

Embodiments of the present invention include a paper bag that includes a bag container formed of paper with a collar about its opening, where the collar is formed by portions of the bag container folded over about the opening. The collar may include a corrugated cardboard collar reinforcement insert between the folded-over portions of the bag container.

BRIEF DESCRIPTION OF THE DRAWINGS

The disclosure will be readily understood by the following detailed description in conjunction with the accompanying drawings, wherein like reference numerals designate like structural elements, and in which:

FIG. 3 is a side view of a bag according to some embodiments.

FIG. 4 is a side view of a bag according to some embodiments.

FIG. 14 shows an unassembled bag according to some embodiments.

DETAILED DESCRIPTION

Figure 1:
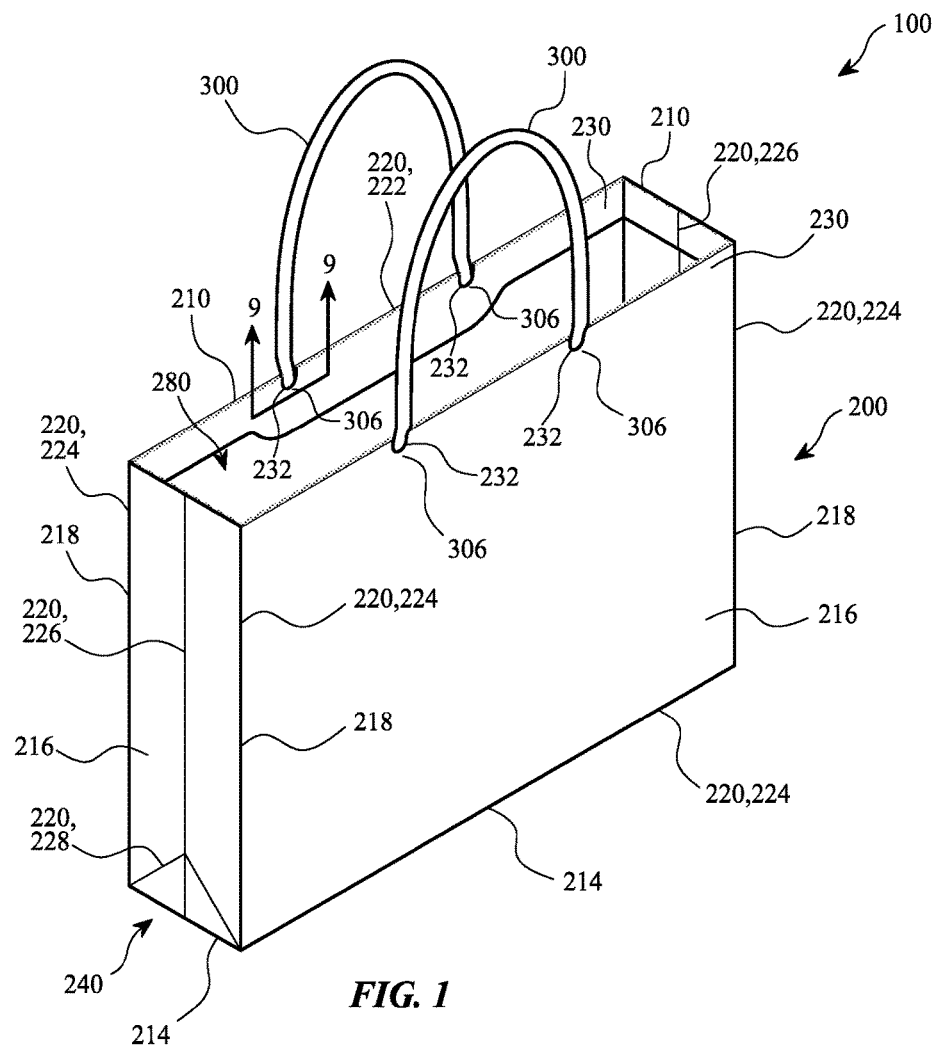
FIG. 1 is a perspective view of a bag according to some embodiments.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The following disclosure relates to a bag, such as a retail shopping bag. The bag may be formed entirely of paper, with the potential exception of adhesives for fixing together portions of the bag. This can help to reduce any environmental impact from production, use, and disposal of the bag. The bag may be formed of a container and a handle.

The bag may be a high-end retail shopping bag, and the bag container may be formed entirely of paper (e.g., dried cellulose pulp), with the potential exception of adhesives. The bag container may be formed of at least 60% recycled (e.g., post-consumer) content, and may be white. To effect its white color, the bag container may be formed of solid bleached sulfate (SBS) paper (including SBS paperboard). SBS paperboard is used to form, for example, high-end retail bags, since it provides a sophisticated fit and finish, in contrast to, for example, craft paper (e.g., used in conventional grocery-store paper bags), which has a rough and dull fit and finish.

Generally, the greater the proportion of post-consumer content in white or SBS paper, the weaker the paper (e.g., the paper will more easily tear (including scoring or cracking)). For this reason, conventional bags formed of SBS paper are made with 50% or less post-consumer content (usually 40% or less), since SBS paper having greater than 40% or 50% post-consumer content would conventionally be considered too weak (e.g., prone to tearing) for use in a bag, particularly a bag with multiple folds such as corner folds or expansion folds that give it shape or allow it to expand from a flat configuration to an open configuration.

To strengthen areas of the bag container, such as folds or gussets at its corners or edges, in some embodiments of the present invention reinforcement inserts may be applied to such areas. The reinforcement inserts may be formed of the same material as the bag container (e.g., SBS with at least 60% post-consumer content). Such reinforcement inserts can augment the strength and resistance to tearing of the bag container material to make it structurally suitable for use as a bag, thereby increasing the amount of post-consumer content usable in an SBS paper bag. This can help to reduce any environmental impact from production, use, and disposal of the bag.

The bag handle may be formed entirely of paper, with the potential exception of adhesives. Typical paper handles are stiff and inflexible; these qualities contribute to a rough, unfinished feel. In some embodiments of the present invention, the bag handle may be formed to have a feel and flexibility unlike that typical of paper, however. For example, the handle's feel and flexibility may be similar to that of a hollow textile tube, like a shoelace. To effect this feel and flexibility, the handle may be formed of knitted paper fibers in a tight-knit pattern with a large diameter. For example, the handle may be formed in an 8-stitch circular-knit pattern, and may have a diameter greater than 6.5 millimeters (e.g., 6.5 millimeters, 8 millimeters, greater than 8 millimeters).

The bag handle may be attached to the bag container along an upper edge of the bag container. The upper edge may be formed by the fold line of a folded-over portion of the bag container. Two notches may be cut out from this folded-over portion on two opposing sides of the bag container. Each end of two bag handles may extend into one of these notches, and between the folded-over portion of the bag container. The ends of the handles between the folded-over portion may be flattened and glued to the bag container between the folded-over portion. The notches in the upper edge of the bag container may be recessed sufficiently deeply from the upper edge so that the bag handles, in the absence of any outside force thereon, will droop below the upper edge of the bag container so that substantially all of the handle (e.g., greater than 90% of the handle) is below the upper edge of the bag container. For example, the notches may be 15 millimeters deep, measured from the upper edge of the bag container. The notches in the bag container, and the flexibility of the handle, contribute to the natural tendency of the handle to droop substantially below the upper edge of the bag, thereby naturally minimizing interference by the handle with objects or structures above the upper edge of the bag (e.g., a shelf, top of a drawer, a user's hand).

These and other embodiments are discussed below with reference to the figures. However, those skilled in the art will readily appreciate that the detailed description given herein with respect to these figures is for explanatory purposes only and should not be construed as limiting.

Figure 2:
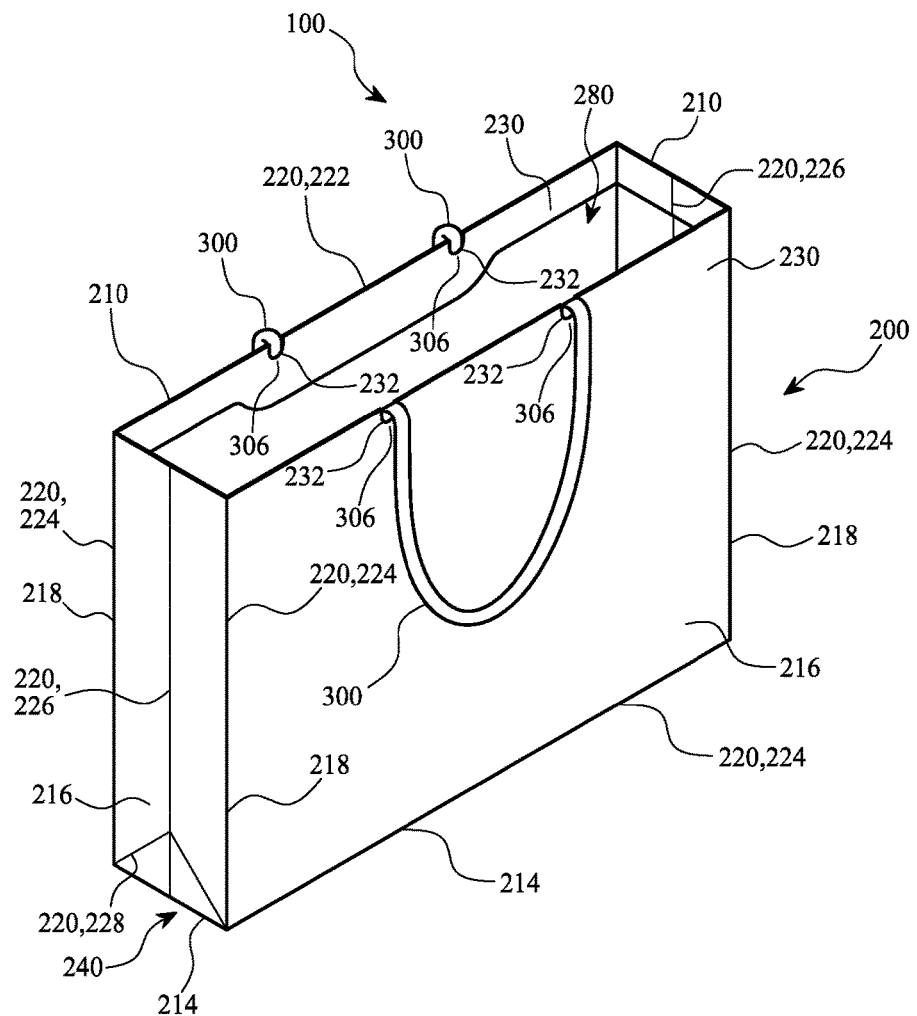
FIG. 2 is a perspective view of a bag according to some embodiments.
Figure 5:
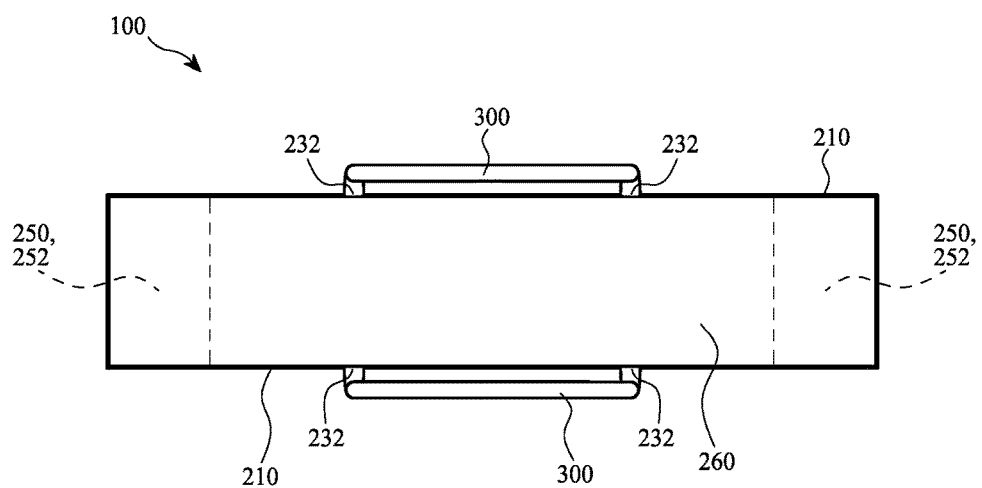
FIG. 5 is a top view of a bag according to some embodiments.
Figure 6:
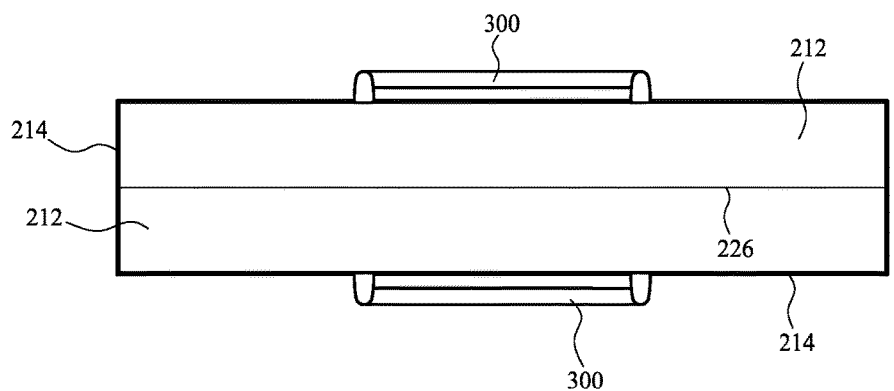
FIG. 6 is a bottom view of a bag according to some embodiments.
Figure 13:
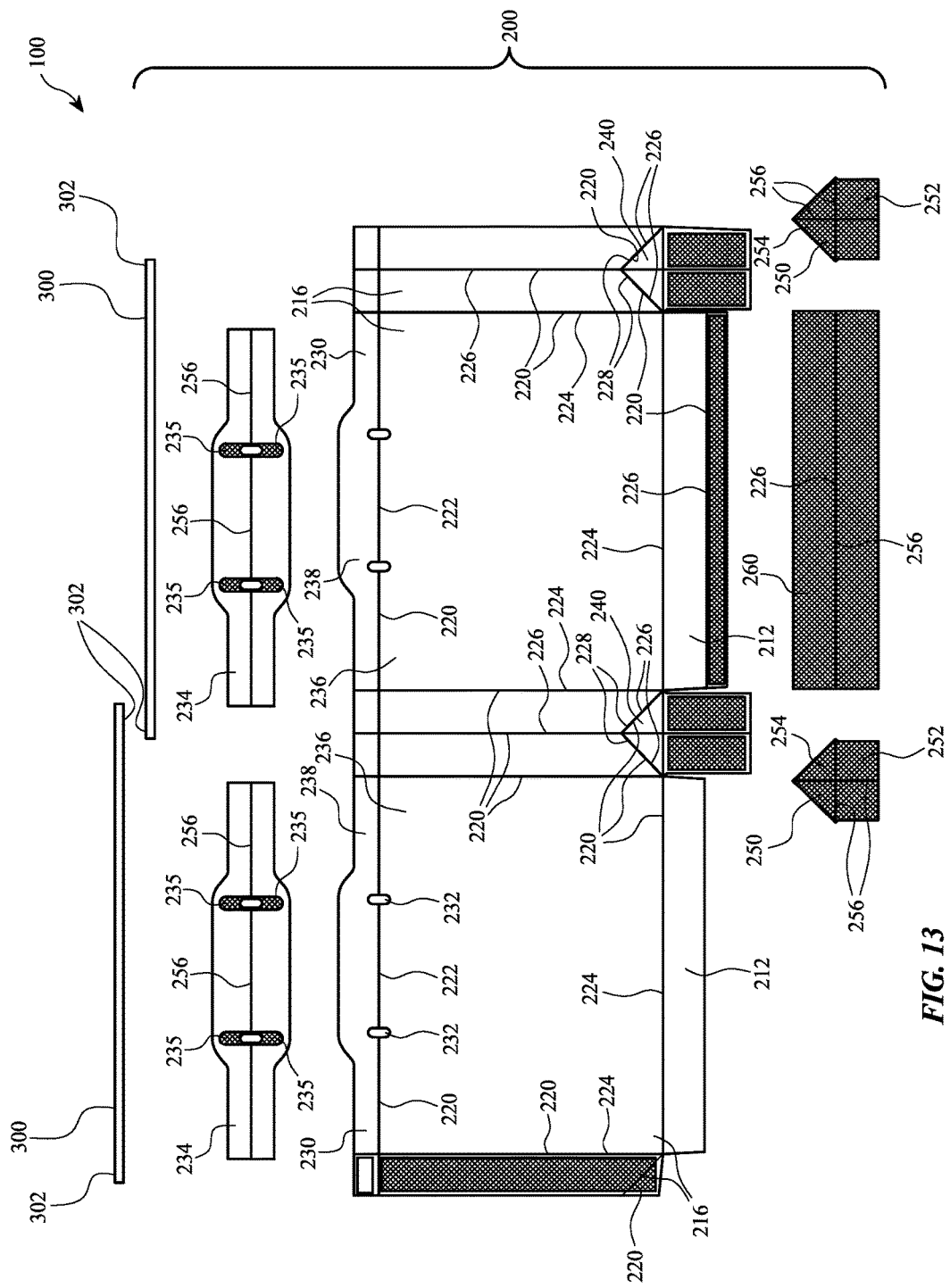
FIG. 13 shows an unassembled bag according to some embodiments.

FIGS. 1 and 2 illustrate bag 100 in perspective view. FIGS. 3 and 4 illustrate bag 100 in side view. FIG. 5 illustrates bag 100 in top view. FIG. 6 illustrates bag 100 in bottom view. FIGS. 13 and 14 illustrate different sizes of bag 100 in unassembled states. Bag 100 may include bag container 200 and bag handle 300. Bag handle 300 may be attached to bag container 200 such that bag 100 can be carried by bag handle 300. Bag 100 may be used to transport an object therein. For example, the object may be contained within bag container 200, and transported along with bag 100 by a user carrying bag 100 by bag handle 300.

Figure 9:
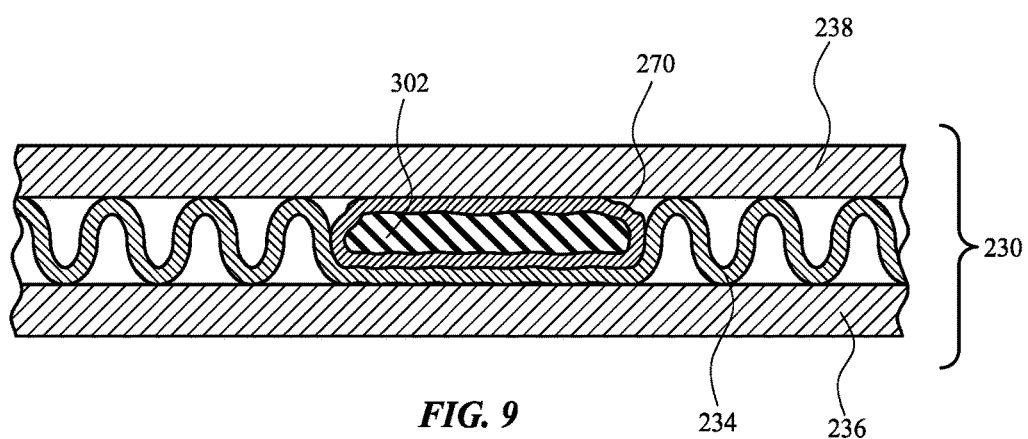
FIG. 9 is a cross-sectional view taken along line 9-9 of FIG. 1.

Bag container 200 may be formed entirely of paper, with the potential exception of adhesive (e.g., adhesive 270, see FIG. 9; adhesives are also shown in FIG. 13 by the hatched portions, but are not separately labeled for clarity). Adhesives described herein may be, for example, hot glue, white glue, tape (including double-sided tape), and rubber cement. Bag container may be formed of a bottom panel 212 (see FIG. 6) and a plurality of side panels 216 (e.g., four side panels). Side panels 216 may be connected to other side panels 216 as side corners 218, and side panels 216 may be connected to bottom panel 212 at bottom corners 214. Side corners 218 and bottom corners 214 may be formed by corner folds 224, and thus side panels 216 and bottom panel 212 may be at least partially continuous with each other across side corners 218 and bottom corners 214.

Figure 10:
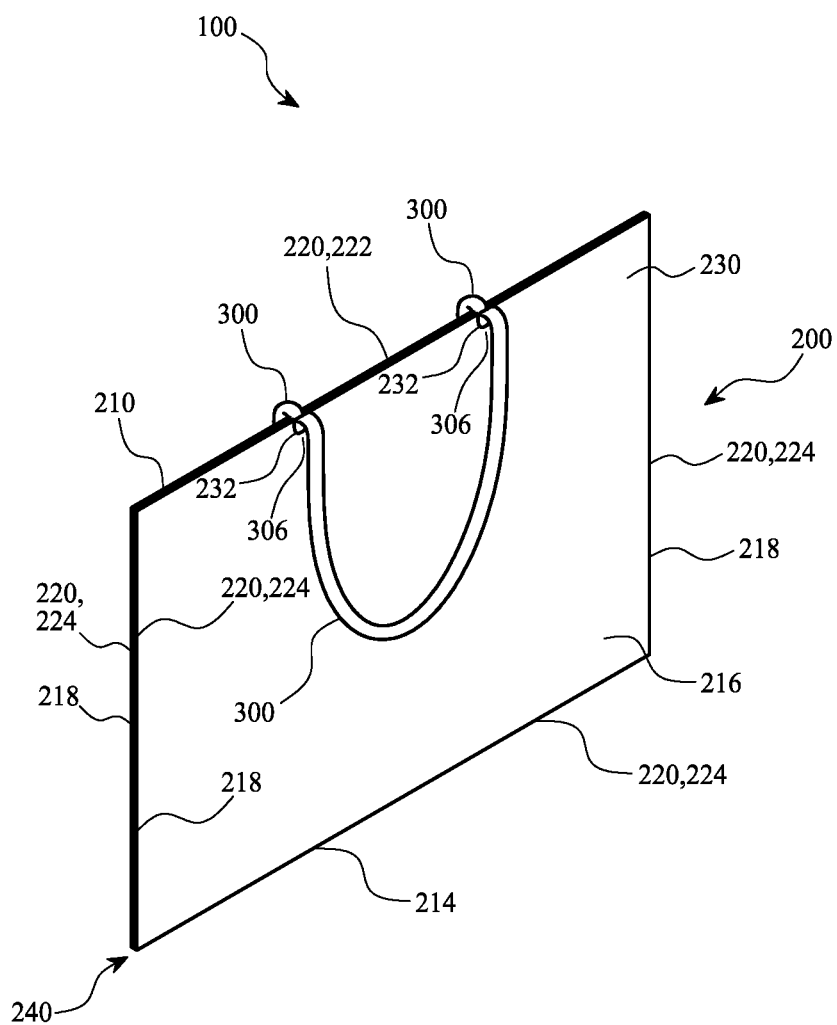
FIG. 10 is a perspective view of a bag in a flattened configuration according to some embodiments.

Bag container 200's shape and operation may be defined by container folds 220, including top edge fold 222, corner folds 224, expansion folds 226, and gusset folds 228. Bag folds 220 may transition from a flattened configuration to an expanded configuration, and vice versa. In FIGS. 1-6, bag container 200 is shown in the expanded configuration. FIG. 10 shows bag 100 in the flattened configuration. Corner folds 224 may define corners of bag container 200 in the expanded configuration. Expansion folds 226 (including gusset folds 228, which are a kind of expansion fold) may be unfolded in the expanded configuration, and may be disposed within panels of bag container 200 (e.g., side panels 216).

Bag handle 300 may be formed entirely of paper, with the potential exception of adhesive (e.g., adhesive 270, see FIG. 9). Bag handle 300 may be fixed to bag container 200. In some embodiments, bag 100 includes two bag handles 300, each one fixed to an opposing side panel 216 of bag container 200. Each bag handle 300 may be fixed to bag container 200 at two areas, as shown in FIGS. 1-6. For example, each bag handle 300 may be in a linear form, having two ends 302 (see FIG. 8). Each bag handle 300 may be fixed to bag container 200 at each of its ends 302. Each bag handle 300 may be longer (e.g., by greater than 1.5 times) than the distance between the two areas of bag container 200 to which its ends are fixed.

In some embodiments of the present invention, bag container 200 is formed entirely of paper, with the possible exception of adhesive. In some embodiments, the paper is white, and may be SBS paper having greater than 50% post-consumer content. In some embodiments it is SBS paper having at least 60% post-consumer content (e.g., 60% post-consumer content).

To help compensate for reduced strength and increased susceptibility to tearing that is attendant to SBS paper having greater than 50% post-consumer content, bag container 200 may include a reinforcement insert, such as, for example, corner reinforcement insert 250. Since the paper material of bag container 200 may be weakest and most susceptible to tearing at its folds (e.g., container folds 220), the reinforcement insert may traverse such a fold and extend past it on either side of it in order to contribute additional strength to the fold.

Figure 8:
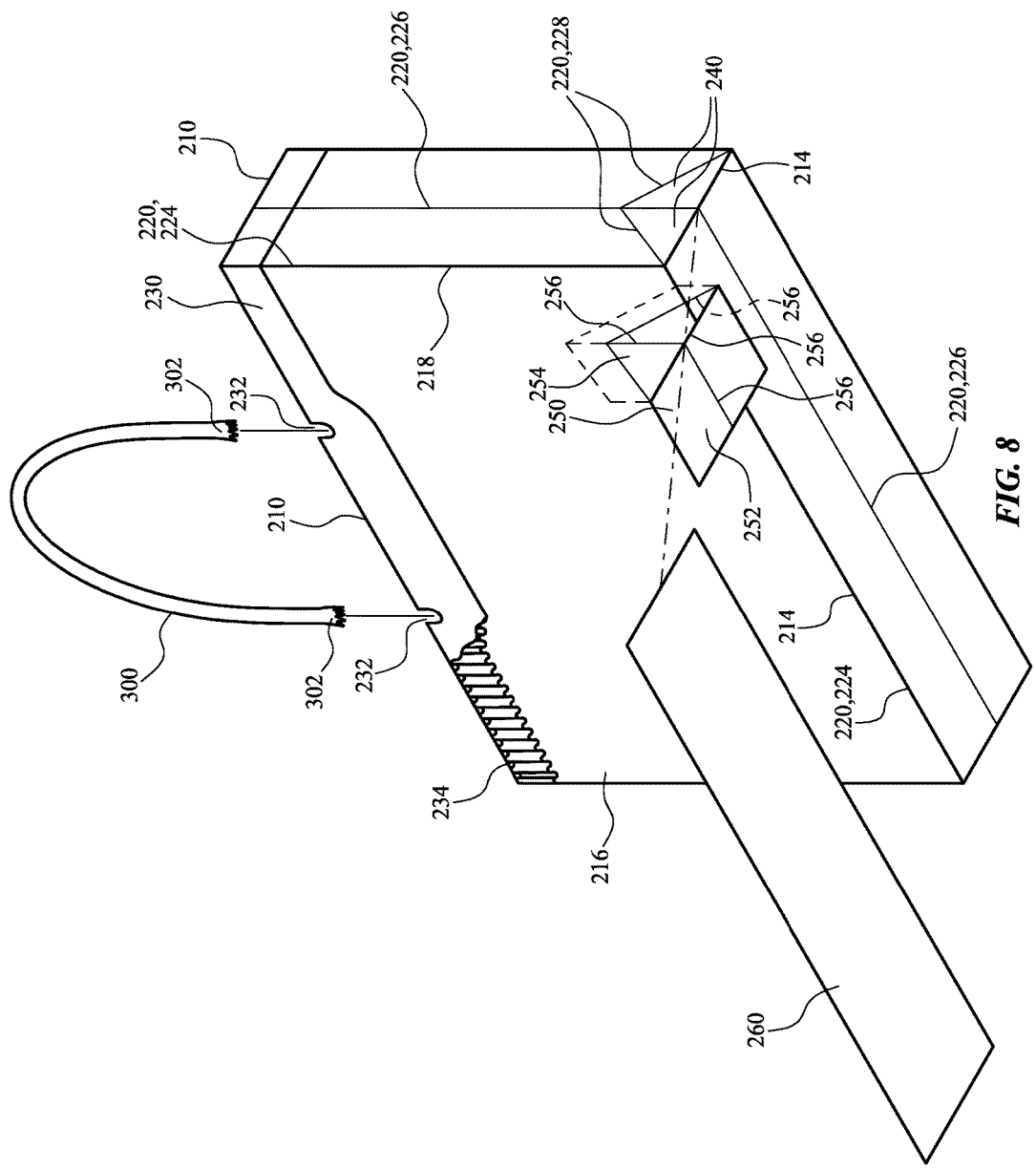
FIG. 8 is a partial exploded view of a bag according to some embodiments.

Corner reinforcement insert 250 may be fixed to a panel of bag container 200, and in some embodiments may bridge two or more panels of bag container 200 (e.g., across a fold therebetween). FIG. 8 shows a partial exploded view of bag 100. As shown in FIG. 8, corner reinforcement insert 250 extends over portions of bottom panel 212 and a side panel 216, traversing a bottom corner 214, including portions of corner fold 224 at bottom corner 214, and expansion folds 226 extending from bottom corner 214. In some embodiments corner reinforcement insert 250 also extends over portions of gusset folds 228, as shown by the portion of corner reinforcement insert 250 drawn in broken lines in FIG. 8. A single corner reinforcement insert 250 is shown in FIG. 8 for clarity, but some embodiments include multiple corner reinforcement inserts 250 (e.g., two, one at each bottom end corner of bag container 200).

In some embodiments, in order to move with the rest of bag container 200 (e.g., during expansion or compression), corner reinforcement insert 250 may have folds 256 that match container folds 220, as shown in FIG. 8. Other reinforcement inserts may also have such folds 256. In some embodiments it may have edges that align with folds 256, as shown in FIG. 8. For example, corner reinforcement insert 250 may have a bottom portion 252 and a side portion 254.

In some embodiments bottom portion 252 may be rectangular in order to correspond to the shape of the portion of bottom panel 212 that it corresponds to, while extending a consistent distance past bottom corner 214 to contribute strength across bottom corner 214 (e.g., extending at least 10 millimeters past bottom corner 214, such as between 10 and 20 millimeters). In some embodiments bottom portion 252 may be a tab, such as the semicircular tab shown in FIG. 14, in order to provide strength across a container fold while covering a minimal panel area (e.g., of bottom panel 212). Side portion 254, in the case where it does not extend past gusset folds 228, may be triangular in order to extend past bottom corner 214 while avoiding interference with gusset folds 228. In the case where side portion 254 does extend past gusset folds 228, side portion 254 may be triangularly shaped in order to correspond to and extend a consistent distance past gusset folds 228 to contribute strength across gusset folds 228 (e.g., extending at least 10 millimeters past bottom corner 214, such as, for example, between 10 and 20 millimeters).

In some embodiments, corner reinforcement insert 250 is formed of the same paper material as the rest of bag container 200 (e.g., SBS paper having at least 50% post-consumer content (e.g., 60% post-consumer content, or greater than 60% post-consumer content)). This helps give it a low environmental impact similar to the rest of bag container 200, thereby contributing to the low environmental impact of bag 100 overall.

Since an item carried within bag 100 will typically apply force to bag 100 at bottom panel 212, due to the gravitational attraction of the item to the earth, areas near the bottom of bag 100 may be most susceptible to tearing. As described above, corner reinforcement insert 250 may be disposed across a bottom corner 214 of bag container 200—near the bottom of bag 100. In some embodiments bag 100 includes a bottom reinforcement insert 260. Bottom reinforcement insert 260 may span the most of the inside surface of bottom panel 212 (e.g., greater than 90% of the inside surface of bottom panel 212). In some embodiments bottom reinforcement insert 260 spans the entirety of the inside bottom surface of bottom panel 212, thereby masking seams on bottom panel 212 (e.g., from expansion fold 226 or edges of corner reinforcement inserts 250). Bottom reinforcement insert 260 may contribute strength to bag container 200, reducing its risk of tearing (e.g., due to the weight of an item contained therein).

In some embodiments, bottom reinforcement insert 260 is separate from the rest of bag container 200, and is not fixed directly thereto. In such embodiments, bottom reinforcement insert 260 may not have any folds. In some embodiments, bottom reinforcement insert 260 may be fixed to bottom panel 212 of bag container 200 (e.g., by tape or adhesive). In such embodiments, bottom reinforcement insert 260 may have a fold corresponding to expansion fold 226 of bottom panel 212, or may be fixed to only one side of expansion fold 226. Fixing bottom reinforcement insert 260 to the rest of bag container 200 helps retain it therein, and helps ensure consistent proper placement and operation of bottom reinforcement insert 260.

In some embodiments bottom reinforcement insert 260 overlaps a portion of corner reinforcement insert 250. Such overlap may help transfer force applied to bottom insert 260 to corner reinforcement insert 250, so that they can work together to carry the load applied by an item carried within bag 100.

In some embodiments, bottom reinforcement insert 260 is formed of the same paper material as the rest of bag container 200 (e.g., SBS paper having at least 50% post-consumer content (e.g., 60% post-consumer content, or greater than 60% post-consumer content)). This helps give it a low environmental impact similar to the rest of bag container 200, thereby contributing to the low environmental impact of bag 100 overall.

In some embodiments, an upper portion of bag container 200 is folded over on itself along a top edge fold 222 to form a collar 230 about an opening 280 of bag container 200, such that top edge fold 222 defines a top edge 210 of bag container 200. FIG. 9 is a cross-sectional view taken along line 9-9 of FIG. 1, through a single side panel 216 of bag container 200, at an area where bag handle 300 is fixed thereto. As shown in FIG. 9, the inner portion of bag container 200 that is folded over forms inner collar layer 238, and the outer portion of bag container 200 over which inner collar layer 238 is folded forms outer collar layer 236.

Figure 7:
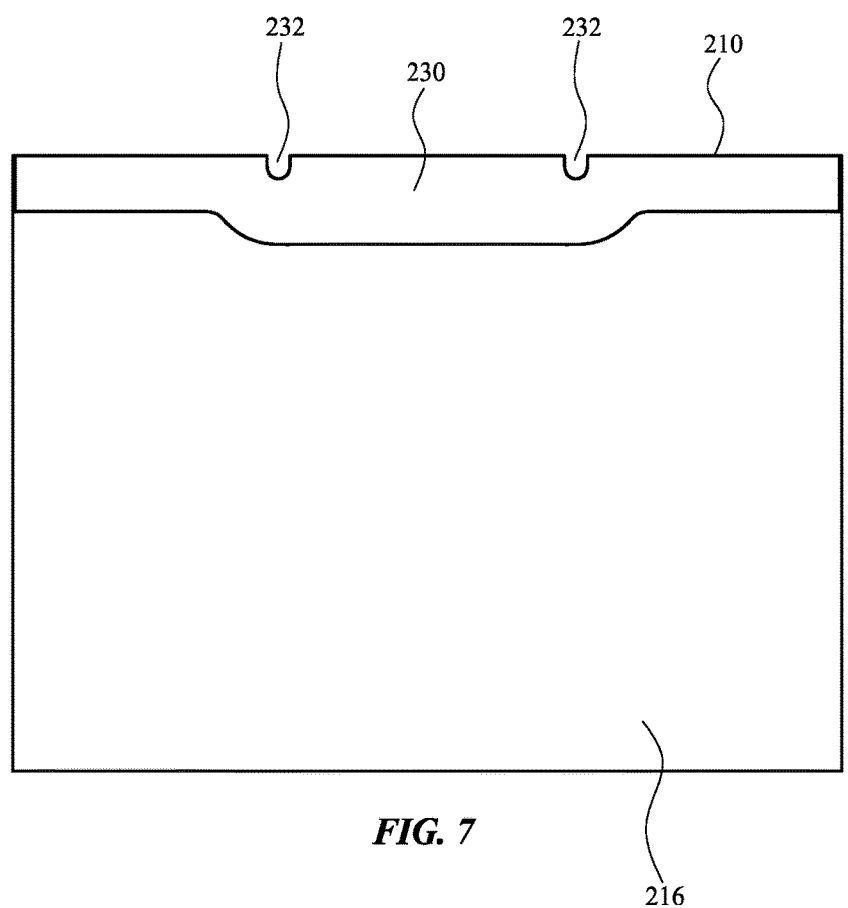
FIG. 7 is an inner side panel of a bag according to some embodiments.

In some embodiments, top edge 210 includes notches 232 formed therein (see, e.g. FIGS. 1, 7, and 8). Each end 302 of bag handle 300 may extend through a notch 232 and between inner collar layer 238 and outer collar layer 236, and may be fixed therebetween (e.g., by adhesive 270).

In some embodiments, a collar reinforcement insert 234 is disposed between inner collar layer 238 and outer collar layer 236. In some embodiments collar reinforcement insert 234 may be fixed to one or both of inner collar layer 238 and outer collar layer 236 (e.g., by adhesive). Collar reinforcement insert 234 may be formed of corrugated paper (including, e.g., corrugated cardboard). Typical reinforcement inserts near a bag's upper edge are formed using non-corrugated gray board. Gray board is less flexible than corrugated paper, and prone to unsightly and structurally compromising creasing, delamination, and detachment upon use (e.g., by opening and closing a bag). The fluting and higher integrity of corrugated paper helps collar 230 flex as forces are applied through it from bag handle 300 to the rest of bag container 200, instead of creasing, delaminating, or detaching. This helps maintain the high integrity of collar 230 and promotes a flexible opening 280 to bag 100, making it easier to insert or remove items.

In some embodiments, collar reinforcement insert 234 is a single-layer insert disposed between inner collar layer 238 and outer collar layer 236 (see, e.g., FIG. 9). In some embodiments, collar reinforcement insert 234 is a multi-layer insert disposed between inner collar layer 238 and outer collar layer 236 (see, e.g., FIG. 13). In the dual-layer embodiment of FIG. 13, collar reinforcement insert 234 may be folded over on itself along with inner collar layer 238 and outer collar layer 236, along fold 256. In such embodiments ends 302 of handle 300 may also be disposed between layers of collar reinforcement insert 234, thereby contributing additional strength to the fixing of ends 302 to bag container 200 at anchor points 306.

Figure 11:
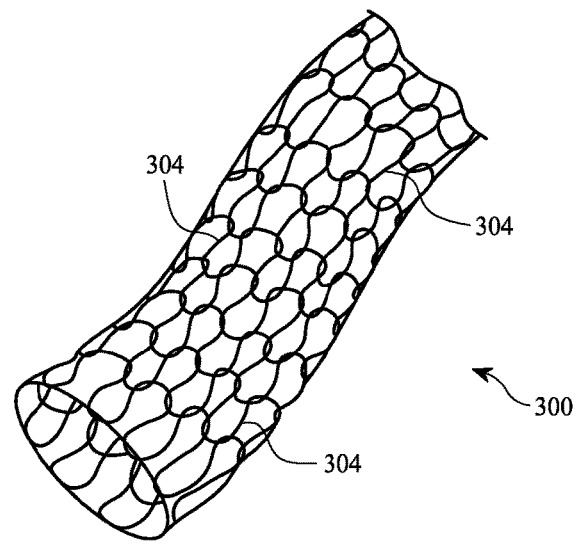
FIG. 11 is an enlarged schematic view of a portion of a bag handle according to some embodiments.
Figure 12:
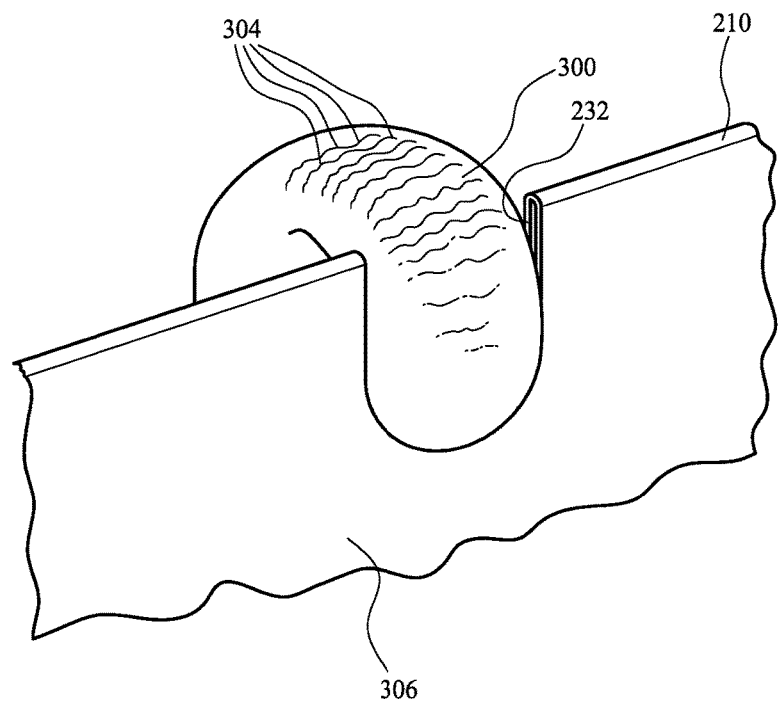
FIG. 12 is an enlarged view taken at circle 12 of FIG. 2.

In some embodiments, bag handle 300 is formed entirely of paper, with the possible exception of adhesive (e.g., adhesive 270 at its ends 302). In some embodiments, bag handle 300 has a circular cross-section. In some embodiments, bag handle 300 may be formed of knitted yarn 304 made of paper fiber. For example, bag handle 300 may be formed of yarn 304 knitted in a circular knit (e.g., on a circular knitting machine). For example, bag handle 300 may be formed of yarn 304 knitted in an 8-stitch circular-knit pattern. In some embodiments, bag handle 300 may be formed in a greater-than-8-stitch pattern. FIG. 11 shows an enlarged schematic view of a portion of bag handle 300, according to an exemplary embodiment. As shown in FIG. 8, yarn 304 undulates around the circumference of bag handle 300, with the same yarn 304 extending toward and away from each end 302 as it loops around to form bag handle 300.

The knitted construction of bag handle 300 gives it a soft feel and high flexibility similar to a textile, such as a shoelace, rather than the stiffness conventionally associated with paper. To further facilitate a textile feel, and to increase a user's comfort while carrying bag 100, bag handle 300 may be formed having a large diameter, such as, for example, greater than 6.5 millimeters (e.g., 6.5 millimeters, 8 millimeters, greater than 8 millimeters). Having a diameter of at least 6.5 millimeters helps distribute the weight of bag 100 (and an item contained therein) over a larger area of the user's hand than would a smaller, more conventional handle.

In some embodiments, handle 300 may be a different color from bag container 200. Such color contrast may help a user more easily find handle 300.

The flexibility of bag handle 300 allows it to "droop" or hang down from an anchor point much like a typical textile, even when the anchored portion is anchored extending upwards. In other words, in some embodiments bag handle 300 will change direction along its length under the influence of gravity. For example, bag handle 300 may extend upward from an anchor point for a short distance due to its initial orientation as fixed to anchor point 306, and will then curve and extend downward under the influence of gravity, as shown, for example, in FIG. 4.

As shown, for example, in FIGS. 1-4, bag handle 300 may be fixed to bag container 200 in such a way that it extends upward away from its anchor points 306 at notches 232. This orientation may help maintain a strong attachment to bag container 200, especially when bag 100 is being carried by bag handle 300. When bag 100 is not being carried, however, the flexibility of bag handle 300 can cause it to droop down along the sides (including interior) of bag 100 (see, e.g., FIGS. 2 and 4). This helps keep bag handle 300 out of the way when, for example, loading items into bag 100. It also helps allow bag 100 to more easily fit in smaller spaces that it could otherwise, by minimizing potential interference due to bag handle 300. For example, a conventional paper handle may remain upright due to its inflexibility, and may thereby impede use or storage of the bag.

To minimize interference due to bag handle 300, bag handle 300 may droop such that it extends substantially below top edge 210 of bag container 200 when not subject to outside forces and when bag 100 is in an upright orientation. For example, 90% or 95% of the substance of bag handle 300 may be disposed below top edge 210 when bag handle 300 is not subject to outside forces and when bag 100 is in an upright orientation.

Bag handle 300 may droop substantially below top edge 210 due to its flexibility, described above. Notches 232 may also contribute to the degree of drooping achieved by bag handle 300. Bag handle 300 may be anchored to bag container 200 below notches 232, and may extend up through notches 232. Notches 232 may be cut out from collar 230, and so may extend from and below top edge 210, as shown, for example, in FIG. 7 (FIG. 7 is an inner view of a side panel of bag container 200, taken from the perspective of line 7-7 of FIG. 4). In this way, notches 232 allow bag handle 300 to begin to droop at a point below top edge 210, allowing it to change direction along its length from up to down without extending substantially above top edge 210. In some embodiments, notch extends greater than 10 millimeters below top edge 210 (e.g., between 10 and 20 millimeters, e.g., 15 millimeters) to facilitate this behavior of bag handle 300.

In some embodiments, ends 302 of bag handle 300 are fixed to bag container 200 at anchor points 306, which may be disposed within collar 230, below notches 232 (see, e.g., FIGS. 1-4). To maintain a flat and thin appearance of collar 230, ends 302 may be flat, and collar reinforcement insert 234 may be debossed at debossed areas 235 where ends are disposed, as shown schematically in the cross-sectional view of FIG. 9 and in the unassembled view of FIG. 13. Ends 302 may be disposed on either side of collar reinforcement insert 234. Debossing collar reinforcement insert 234 in areas around anchor points 306 can help minimize or eliminate any bulge in collar 230 due to ends 302, by providing room between outer collar layer 236 and inner collar layer 238 to accommodate flattened ends 302, as shown, for example, in FIG. 9. For example, collar 230 may have a thickness of less than 1 millimeter (e.g., 0.5 millimeters, or less than 0.5 millimeters). Such debossing can be accomplished particularly effectively with the corrugated material of collar reinforcement insert 234, since this material includes substantial empty space into which its substance can be pressed.

In some embodiments, ends 302 of bag handle 300 may be pre-flattened (e.g., in a press) before being inserted through notches 232 and fixed between outer collar layer 236 and inner collar layer 238. In some embodiments, ends 302 of bag handle 300 may be flattened while disposed between outer collar layer 236 and inner collar layer 238, before or after fixing them therebetween (e.g., with adhesive 270). In some embodiments, areas of collar reinforcement insert 234 around anchor points 306 may be pre-debossed to provide the space to accommodate ends 302, before ends 302 are fixed to bag container 200. In some embodiments, areas of collar reinforcement insert 234 around anchor points 306 may be effectively debossed by pressing them against ends 302 of bag handle 300. This may occur with pre-flattened ends 302 or may be done simultaneously with flattening of ends 302 in the case where ends 302 are flattened while between outer collar layer 236 and inner collar layer 238 (e.g., within a press fixture).

The foregoing descriptions of the specific embodiments described herein are presented for purposes of illustration and description. These exemplary embodiments are not intended to be exhaustive or to limit the embodiments to the precise forms disclosed. All specific details described are not required in order to practice the described embodiments. For example, bag 100 may be formed of a variety of shapes and sizes other than those depicted in the drawings. Other exemplary shapes and sizes for bag 100 are shown, for example, in U.S. patent application Ser. No. 29/519,818, filed Mar. 9, 2015, titled "Bag," which is incorporated herein in its entirety, by reference thereto.

It will be apparent to one of ordinary skill in the art that many modifications and variations are possible in view of the above teachings, and that by applying knowledge within the skill of the art, one may readily modify and/or adapt for various applications such specific embodiments, without undue experimentation, without departing from the general concept of the present invention. For example, in some embodiments, instead of or in addition to reinforcement inserts to strengthen the bag container having high (e.g., greater than 50%, 60%, greater than 60%) post-consumer-content, a matte plastic film may be applied to bag container 200, the matte plastic film having a higher resistance to tearing than the other material of bag container 200. Such film could be applied to one or both of the entirety of the interior surface or exterior surface of bag container 200, or to discrete areas thereof (e.g., the areas corresponding to those reinforced by reinforcement inserts as described in above embodiments).

Such adaptations and modifications are intended to be within the meaning and range of equivalents of the disclosed embodiments, based on the teaching and guidance presented herein.

The detailed description section is intended to be used to interpret the claims. The summary and abstract sections may set forth one or more but not all exemplary embodiments of the present invention as contemplated by the inventor(s), and thus, are not intended to limit the present invention and the appended claims.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The phraseology or terminology used herein is for the purpose of description and not limitation, such that the terminology or phraseology of the present specification is to be interpreted by the skilled artisan.

The breadth and scope of the present invention should not be limited by any of the above-described exemplary embodiments, but should be defined only in accordance with the following claims and their equivalents.

What is claimed is:

1. A retail paper bag, comprising:
   a white bag container formed entirely of solid bleach sulfate paper with at least 60% post-consumer content; and
   a handle formed entirely of paper fiber yarn knitted in a circular-knit pattern.

2. The paper bag of claim 1, wherein the bag container is formed entirely of:
   the solid bleached sulfate paper with at least 60% post-consumer content, and adhesive.

3. The paper bag of claim 1, comprising a reinforcement insert adhered to an interior of the bag container.

4. The paper bag of claim 3, wherein the reinforcement insert is adhered across a fold of the bag container.

5. The paper bag of claim 3, wherein the reinforcement insert is adhered over a gusset of the bag container.

6. The paper bag of claim 3, wherein the reinforcement insert is formed of solid bleached sulfate paper with at least 60% post-consumer content.

7. The paper bag of claim 3, wherein the reinforcement insert has a rectangular portion and a triangular portion,
   wherein the rectangular portion is adhered to a bottom panel of the bag container, and
   wherein the triangular portion is adhered to a side panel of the bag container.

8. The paper bag of claim 7, wherein the reinforcement insert is a corner reinforcement insert, and
   wherein the paper bag comprises a bottom reinforcement insert, wherein the bottom reinforcement insert is rectangular and extends over the bottom panel.

9. The paper bag of claim 8, wherein the rectangular portion of the corner reinforcement insert is disposed between the bottom panel and the bottom reinforcement insert.

10. The paper bag of claim 1, wherein the circular-knit pattern is an 8-stitch circular-knit pattern.

11. The paper bag of claim 10, wherein the handle has a diameter of at least 6.5 millimeters.

12. The paper bag of claim 1, wherein the bag container has a top edge including a notch,
    wherein an end of the handle extends through the notch and is fixed to the bag container,
    wherein the bag container has a collar about an opening defined by the top edge of the bag container,
    wherein the collar is formed by portions of the bag container folded over about the opening,
    wherein the collar comprises a collar reinforcement insert disposed between the folded-over portions of the bag container, and
    wherein the collar reinforcement insert is corrugated cardboard.

13. The retail paper bag of claim 1, wherein the paper fiber yarn is formed entirely of dried cellulose pulp fibers.

14. A paper bag, comprising:
    a bag container formed of white paper with at least 60% post-consumer content, the bag container having a collar about an opening thereof, wherein the collar is formed by portions of the bag container folded over about the opening; and
    a bag handle, the bag handle comprising two ends, wherein the ends of the bag handle are fixed to the bag container between the folded-over portions of the bag container,
    wherein the collar comprises a collar reinforcement insert disposed between the folded-over portions of the bag container,
    wherein the collar reinforcement insert is corrugated cardboard, and
    wherein the cardboard is debossed where the bag handle is fixed to the bag container.

15. The paper bag of claim 14, wherein the collar is flat across areas where the ends of the bag handle are fixed to the bag container.

16. A retail paper bag, comprising:
    a bag container formed of white paper with at least 60% post-consumer content;
    a rectangular bottom reinforcement insert; and
    a corner reinforcement insert adhered to an interior of the bag container, the corner reinforcement insert having a rectangular portion adhered to a bottom panel of the bag container and a triangular portion adhered to a side panel of the bag container,
    wherein the rectangular bottom reinforcement insert extends over the bottom panel of the bag, and
    wherein the rectangular portion of the corner reinforcement insert is disposed between the bottom panel and the bottom reinforcement insert.

* * * * *